United States Patent
Dattathreya et al.

(10) Patent No.: US 8,321,914 B2
(45) Date of Patent: Nov. 27, 2012

(54) SYSTEM AND METHOD FOR VERIFYING AN ATTRIBUTE IN RECORDS FOR PROCUREMENT APPLICATION

(75) Inventors: Macam S. Dattathreya, Sterling Heights, MI (US); William Philip Shaouy, Atlanta, GA (US); Russell Thomas White, Jr., Conklin, NY (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 12/017,075

(22) Filed: Jan. 21, 2008

(65) Prior Publication Data

US 2009/0187973 A1    Jul. 23, 2009

(51) Int. Cl.
G06F 21/00 (2006.01)
G06F 7/04 (2006.01)
G06F 17/30 (2006.01)
G06F 15/16 (2006.01)

(52) U.S. Cl. .......... 726/4; 726/5; 705/50; 705/51; 705/28; 709/204; 709/246; 713/165; 713/182; 713/194; 380/286

(58) Field of Classification Search .......... 726/4, 5; 705/50, 51, 28; 709/204, 246; 713/165, 713/182, 194; 380/286
See application file for complete search history.

(56) References Cited

U.S. PATENT DOCUMENTS

| | | | |
|---|---|---|---|
| 5,640,556 A * | 6/1997 | Tamura | 1/1 |
| 6,266,705 B1 * | 7/2001 | Ullum et al. | 709/238 |
| 6,374,252 B1 * | 4/2002 | Althoff et al. | 1/1 |
| 6,697,865 B1 * | 2/2004 | Howard et al. | 709/229 |
| 6,795,868 B1 | 9/2004 | Dingman et al. | |
| 6,850,900 B1 * | 2/2005 | Hare et al. | 705/80 |
| 6,853,997 B2 | 2/2005 | Wotring et al. | |
| 7,051,071 B2 | 5/2006 | Stewart et al. | |
| 7,058,924 B2 | 6/2006 | Greenstein | |
| 7,246,319 B2 | 7/2007 | Alden et al. | |
| 7,249,157 B2 | 7/2007 | Stewart et al. | |
| 7,577,953 B1 * | 8/2009 | Verego et al. | 718/100 |
| 2005/0114369 A1 * | 5/2005 | Gould et al. | 707/100 |
| 2007/0203933 A1 * | 8/2007 | Iversen et al. | 707/102 |
| 2008/0052270 A1 * | 2/2008 | Karlsson | 707/3 |

* cited by examiner

*Primary Examiner* — Edan Orgad
*Assistant Examiner* — Kari Schmidt
(74) *Attorney, Agent, or Firm* — Schmeiser, Olsen & Watts; John R. Pivnichny

(57) ABSTRACT

A system and associated method for verifying an attribute in records for a procurement application. The procurement application employs a database having a company profile record, a user profile record, and a requisition object record, among which share a company_code attribute as a target attribute that is desired to be valid. The company profile record has a validity attribute, and the requisition object record has a validity flag, to indicate validities of the value for the target attribute in respective record. A company profile configuration module configures the company profile record. A user profile verification module prohibits a user without a valid user profile from accessing the procurement application. A user profile cleanup program removes invalid user profile records from the database. A requisition object verification module checks out valid values for the company_code attribute from the company profile records and blocks modification to invalid requisition objects.

20 Claims, 7 Drawing Sheets

ONE EMBODIMENT OF USER PROFILE CLEANUP PROGRAM
700

UNIX® SHELL SCRIPT
"delete_invalid_profiles.sh"
710

```
711: set db_name = $argv[1]

712: set db_table = $argv[2]

713: set column_name = $argv[3]

714: set values = $argv[4]

715: delete * from "$db_name"."$db_table" where
"$column_name" in ("$values")
```

COMMAND INVOKING UNIX SHELL SCRIPT
"delete_invalid_profiles.sh"
750

```
% delete_invalid_profiles.sh proc temployee_profile chrg_co_cd
'ABC','DEF','GHI'
%
```

FIG. 6

SYSTEM AND METHOD FOR VERIFYING AN ATTRIBUTE IN RECORDS FOR PROCUREMENT APPLICATION

FIELD OF THE INVENTION

The present invention discloses a system and associated method for enhancing functionality of an existing software application without redesigning the existing software application, especially in a case of a procurement application.

BACKGROUND OF THE INVENTION

Conventional procurement applications are massive in scale and must operate with frequently updated data. Due to the nature of a procurement application, some attributes of data must be valid to justify an access to the procurement application. However, such crucial attributes may be developed only after the procurement application is designed and deployed. In such a case, the whole procurement application must be redesigned to support verification of the attribute. Redesigning a procurement application upon each emerging need for verifying a new attribute demands a lot of time and is very costly.

Thus, there is a need for a system and associated method that overcomes at least one of the preceding disadvantages of current methods and systems for verifying a new attribute in a procurement application.

SUMMARY OF THE INVENTION

The present invention provides a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a computer program product, comprising a computer usable storage medium having a computer readable program code embodied therein, said computer readable program code containing instructions that when executed by a processor of a computer system implement a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a computer system comprising a processor and a computer readable memory unit coupled to the processor, said memory unit containing instructions that when executed by the processor implement a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a process for supporting computer infrastructure, said process comprising providing at least one support service for at least one of creating, integrating, hosting, maintaining, and deploying computer-readable code in a computing system, wherein the code in combination with the computing system is capable of performing a method for verifying a target attribute of a company profile record for a procurement application, wherein the procurement application supports a requisition transaction among at least two users who represent respective companies, the method comprising:

configuring a validity attribute of the company profile record to indicate whether the target attribute of the company profile record is valid, wherein the company profile record is stored in a database, wherein said configuring is performed by a company profile configuration module;

subsequent to said configuring, authenticating a user prior to logging in the user to the procurement application, wherein the user is represented by a user profile record stored in the database, wherein the user profile record comprises the target attribute with a valid instance for the target attribute, wherein the user profile record comprising an invalid instance for the target attribute is targeted to be removed from the database later by a user profile cleanup program, wherein said authenticating is performed by a user profile verification module; and subsequent to said authenticating, verifying a requisition object against the company profile record for a value of the target attribute of the requisition object that the user attempts to modify and subsequently prohibiting the user from modifying the requisition object determined to be invalid from said verifying, wherein the requisition object is represented by a requisition object record stored in the database, wherein the requisition object record comprises the target attribute and a validity flag, wherein said verifying is performed by a requisition object verification module.

The present invention provides a method and system that overcomes at least one of the current disadvantages of conventional method and system for enhancing an existing procurement application with a verification of a record used in the procurement application.

BRIEF DESCRIPTION OF THE DRAWINGS

FIG. 6 illustrates an example of the user profile cleanup program of the company verification system in FIG. 2, in accordance with the embodiments of the present invention.

DETAILED DESCRIPTION OF THE INVENTION

The method of the present invention enhances a procurement application by verifying an attribute of a record that is desired to be valid in the procurement application.

The method of the present invention standardizes a software upgrade process for a procurement application to compensate for an obsolete company associated with user profile records, rather than redesigning the procurement application. The method of the present invention is applicable to any attribute of records that is desired to be valid in order to properly execute a procurement application.

Figure 1:
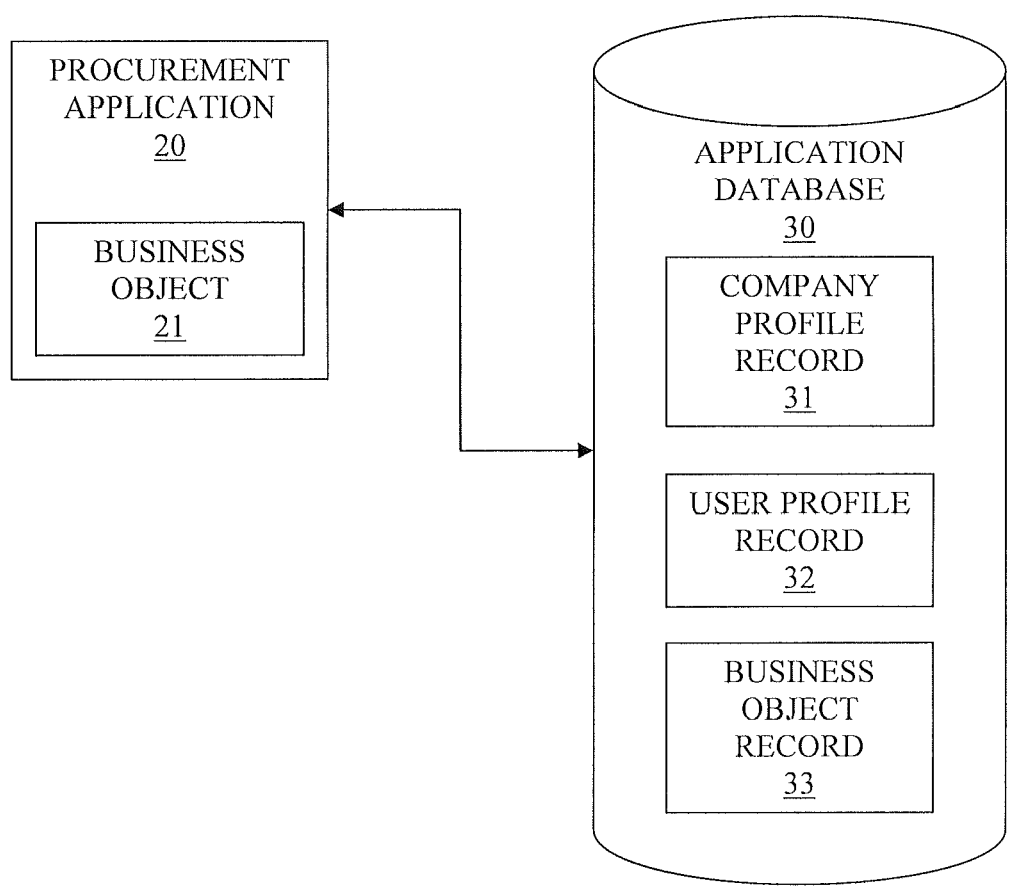
FIG. 1 illustrates a conventional procurement system comprising a procurement application and an application database.

FIG. 1 illustrates a conventional procurement system 10 comprising a procurement application 20 and an application database 30, wherein the application database 30 comprises company profile records 31, user profile records 32, and requisition object records 33.

The procurement application 20 is an electronic business solution providing purchase and/or sale of products and/or services through networking systems among participating parties. The procurement application 20 typically provides all transactional functionalities. Examples of transactions may be, inter alia, resource planning, maintenance, oversight, approval, accounting, etc. Examples of procurement applications may be, inter alia, the IBM Buy on Demand (BonD), Ariba®, the SAP Enterprise Resource Planning (SAP ERP), the SAP Supplier Relationship Management application (SAP SRM), etc.

The procurement application 20 comprises a business object 21 that represents a business transaction that takes place through the procurement application 20. The business object 21 has a company_code attribute to relate the business object to a company participating in the business transaction that is represented by the business object 21. The business object 21 is typically implemented as a class within the procurement application, and stored in the application database 30 as a business object record 33.

The company may be, inter alia, a customer, a product supplier, a service provider, etc. The procurement application 20 employs the application database 30 for records of the procurement application 20. Examples of the application database 30 may be, inter alia, a custom-designed procurement database, IBM DB2, Oracle®, MySQL®, etc.

Figure 2:
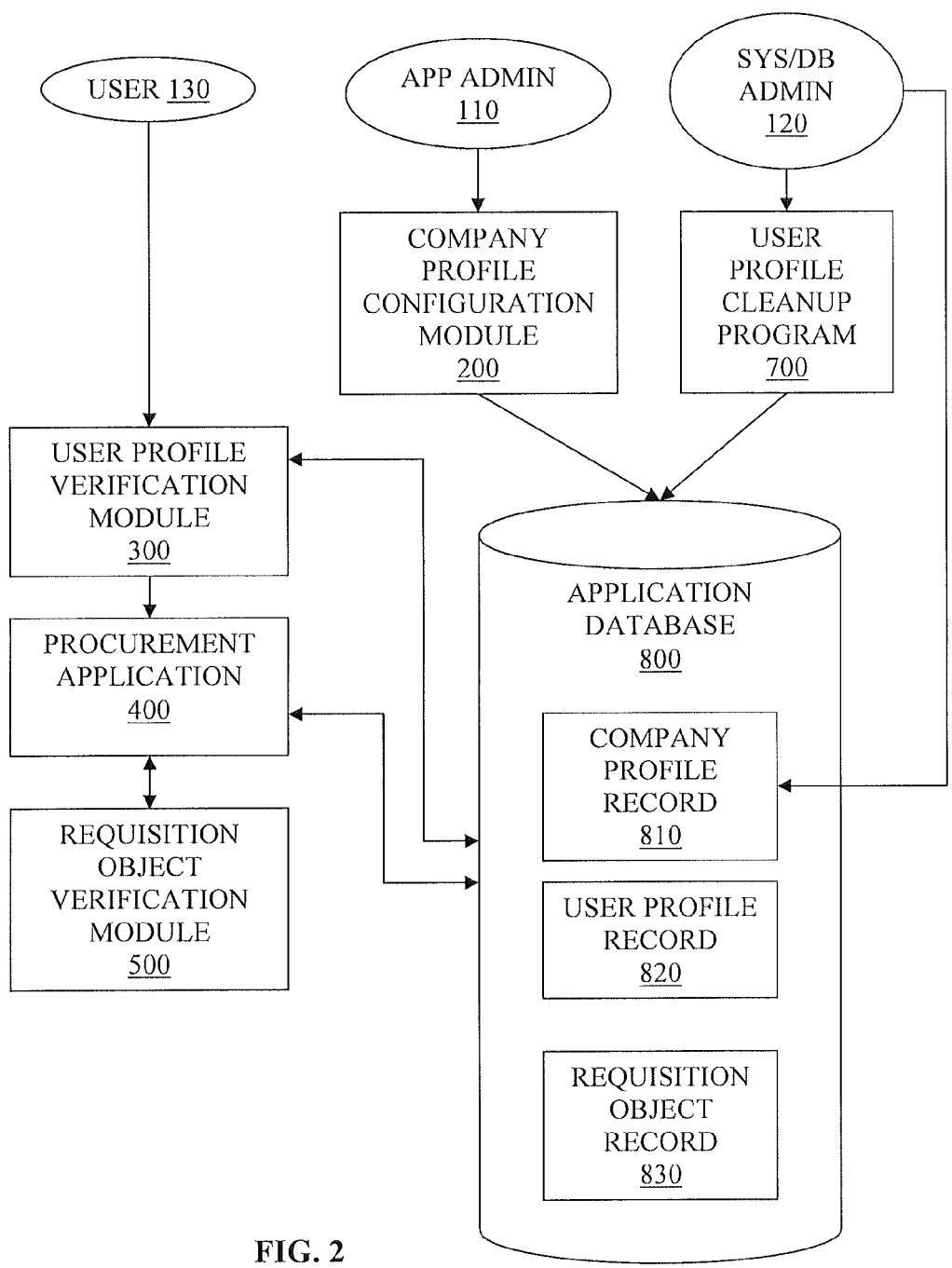
FIG. 2 illustrates a company verification system for verifying a company_code attribute for a procurement application, in accordance with embodiments of the present invention.

FIG. 2 illustrates a company verification system 100 for verifying a company_code attribute for a procurement application 400, in accordance with embodiments of the present invention.

The company verification system 100 comprises a company profile configuration module 200, a user verification module 300, the procurement application 400, a requisition verification module 500, a user profile cleanup program 700, and the application database 800. The application database 800 comprises a company profile record 810, a user profile record 820, and a requisition business object record 830. The company profile record 810 comprises a company_code attribute that is a target attribute to be verified, and a company_valid attribute that is a validity attribute that marks whether the target attribute is valid or not. The user profile record 820 comprises a company_code attribute that is a target attribute. The requisition object record 830 comprises a company_code attribute that is a target attribute and company_valid flag that marks whether the target attribute is valid or not.

The company_valid attribute is inserted into the company profile record 810 when the company_code attribute of the company profile record 810 is desired to be verified for the procurement application 400. The company_code attribute of the company profile record 810 is a target attribute that is desired to be verified. The company_valid attribute is a validity attribute that indicates whether the company profile record 810 has a legitimate and up-to-date instance for the company_code attribute of the company profile record 810.

An application administrator 110 configures the company profile record 810 through the company profile configuration module 200, after inserting the company_valid attribute into the company profile record 810. The company_valid attribute of the company profile record 810 has a binary value indicating that the company_code attribute of the company profile record 810 is either valid or invalid. The company_valid attribute of the company profile record 810 is initialized as valid upon creation.

When a user 130 attempts to log in to the procurement application 400, the user profile verification module 300 verifies the user profile record 820 of the user 130 against the company profile record 810. The user 130 with a valid instance for the company_code attribute of the user profile record 820 successfully logs in to the procurement application 400 and proceeds with creating a requisition object record 830 for a business transaction.

The requisition object record 830 represents a requisition transaction that the user 130 has created within the procurement application 400. The company_valid flag of the requisition object record 830 indicates whether the company_code attribute of the requisition object record 830 is instantiated with a valid value that is available in the company profile record 810 in the application database 800.

When the user 130 attempts to modify the requisition object record 830, a requisition object verification module 500 verifies the requisition object record 830 against the company profile record 810.

The database cleanup program 700 cleans up the user profile record 820 that has an invalid instance for the company_code attribute of the user profile record 820. The database cleanup program 700 may be performed with a command of a system and/or database administrator 120 or may be periodically performed by a scheduler of an operating system on which the application database 800 is implemented.

Figure 3:
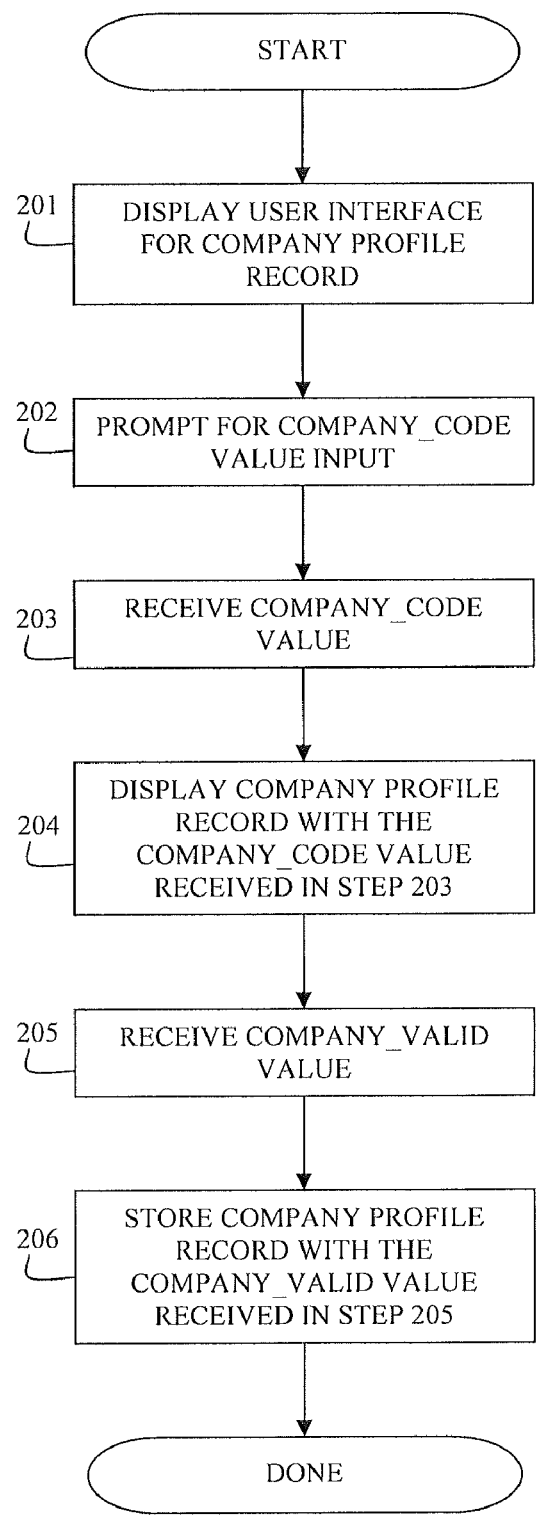
FIG. 3 is a flowchart depicting a method for the company profile configuration module of the company verification system in FIG. 2, in accordance with the embodiments of the present invention.

FIG. 3 is a flowchart depicting a method for the company profile configuration module 200 of the company verification system 100 in FIG. 2, in accordance with the embodiments of the present invention.

Initially, company profile records stored in the application database comprise the company_code attribute. The company_code attribute is a target attribute that is desired to be valid for the procurement application. Thus, a database administrator inserts a new attribute to mark the validity of the target attribute, which is the company_valid attribute, into the company profile record. The company_valid attribute is initially set as valid by the database administrator at the time when the company_valid attribute is created or by an application administrator after the company_valid attribute is created within the company profile records.

In step 201, the company profile configuration module displays a user interface for the application administrator to enable configuring company profile records that are stored in the application database. The user interface enables the application administrator to input values for company profile records.

In step 202, the company profile configuration module prompts the application administrator to input a value for the company_code attribute.

In step 203, the company profile configuration module receives the value for the company_code attribute from the application administrator.

In step 204, the company profile configuration module retrieves and displays content of a company profile record that has a same value for the company_code attribute to enable the application administrator to edit values for the company profile record.

In step 205, the company profile configuration module receives a validity value, which is valid or invalid, for the company_valid attribute from an input of the application administrator. The validity value is predefined as a pair of values indicating valid or invalid, as in YES/NO, 1/0, etc.

In step 206, the company profile configuration module stores the company profile record back to the application database with the validity value for the company_valid attribute received in step 205.

Figure 4:
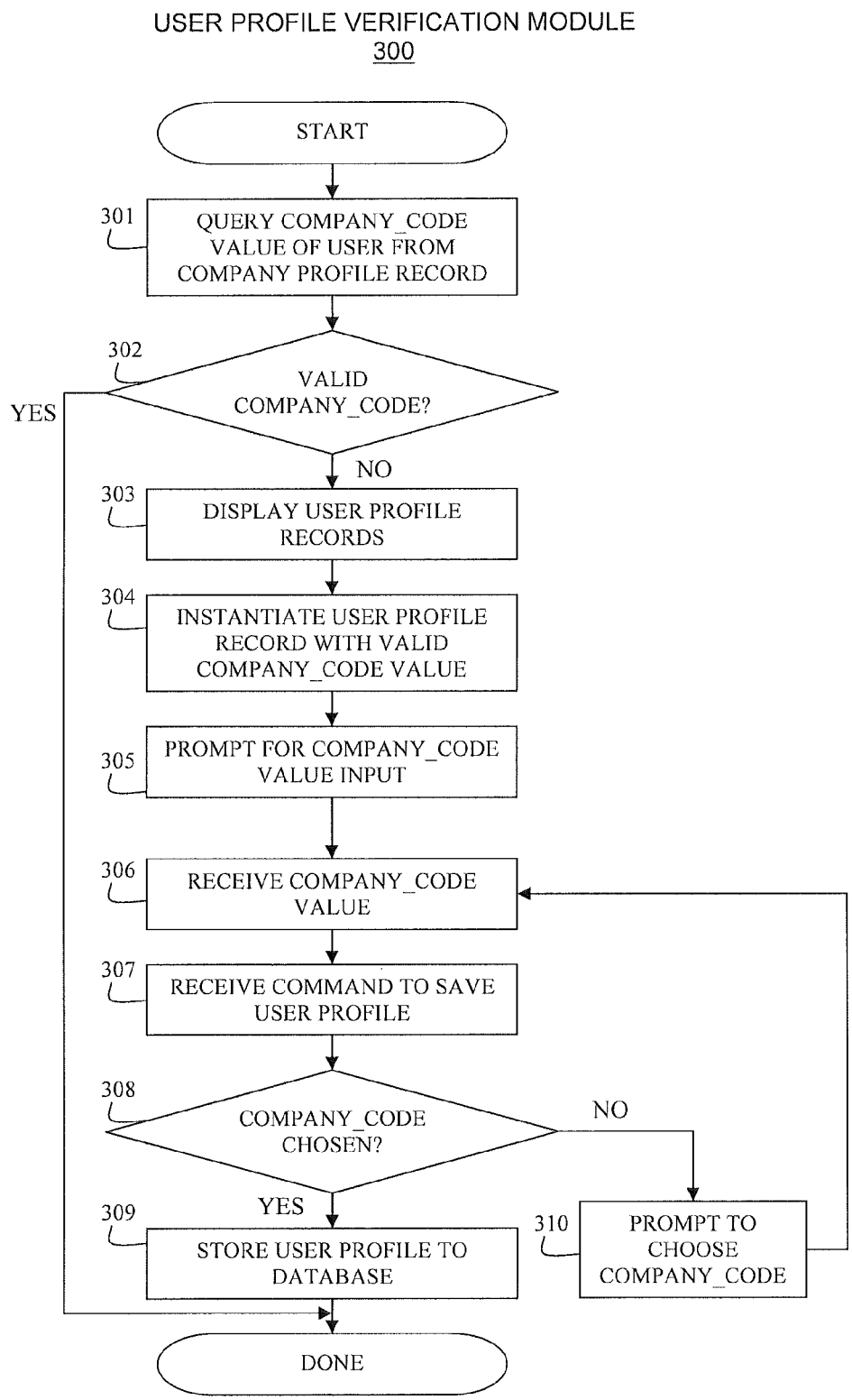
FIG. 4 is a flowchart depicting a method for the user profile verification module of the company verification system in FIG. 2, in accordance with the embodiments of the present invention.

FIG. 4 is a flowchart depicting a method for the user profile verification module 300 of the company verification system 100 in FIG. 2, in accordance with the embodiments of the present invention.

When a user profile record is created by a new user who is logging in to the procurement application, the user profile record comprises a same company_code attribute as is comprised by a company profile record, and the company_code attribute of the user profile record is assigned to a value in the company_code attribute of a company profile record in the application database.

In step 301, the user profile verification module queries the company profile record in the application database with a value for the company_code attribute in the user profile record of the user who attempts to log in to the procurement application.

In step 302, the user profile verification module determines whether the user profile record has a valid value for the company_code attribute. If the user profile verification module determines that the user profile record does not have a valid value for the company_code attribute, the user profile verification module proceeds with step 303. If the user profile verification module determines that the user profile record has a valid value for the company_code attribute, the user profile verification module terminates because the user profile record is suitable for the procurement application to use in business transactions involving the user represented by the user profile record.

In step 303, the user profile verification module displays the user profile record for the user with an invalid value for the company_code attribute.

In step 304, the user profile verification module instantiates the company_code attribute of the user profile record with a valid company_code values available in the company profile record. When multiple values are available for the company_code, the user profile verification module displays a list of available company_code values and prompts the user to select one for the user profile record out of the list of available company_code values.

In step 305, the user profile verification module prompts the user to input a company_code value for the company_code attribute of the user profile record.

In step 306, the user profile verification module receives a company_code value from the user for the company_code attribute.

In step 307, the user profile verification module receives "save user profile command" from the user.

In step 308, the user profile verification module determines whether a company_code attribute is selected by the user. If the user profile verification module determines that a company_code attribute is properly selected, the user profile verification module proceeds with step 309. If the user profile verification module determines that a company_code attribute is not properly selected, the user profile verification module proceeds with step 310.

In step 309, the user profile verification module stores the user profile to the user profile record of the application database.

In step 310, the user profile verification module informs the user to choose a valid company_code, and loops back to step 306.

Figure 5:
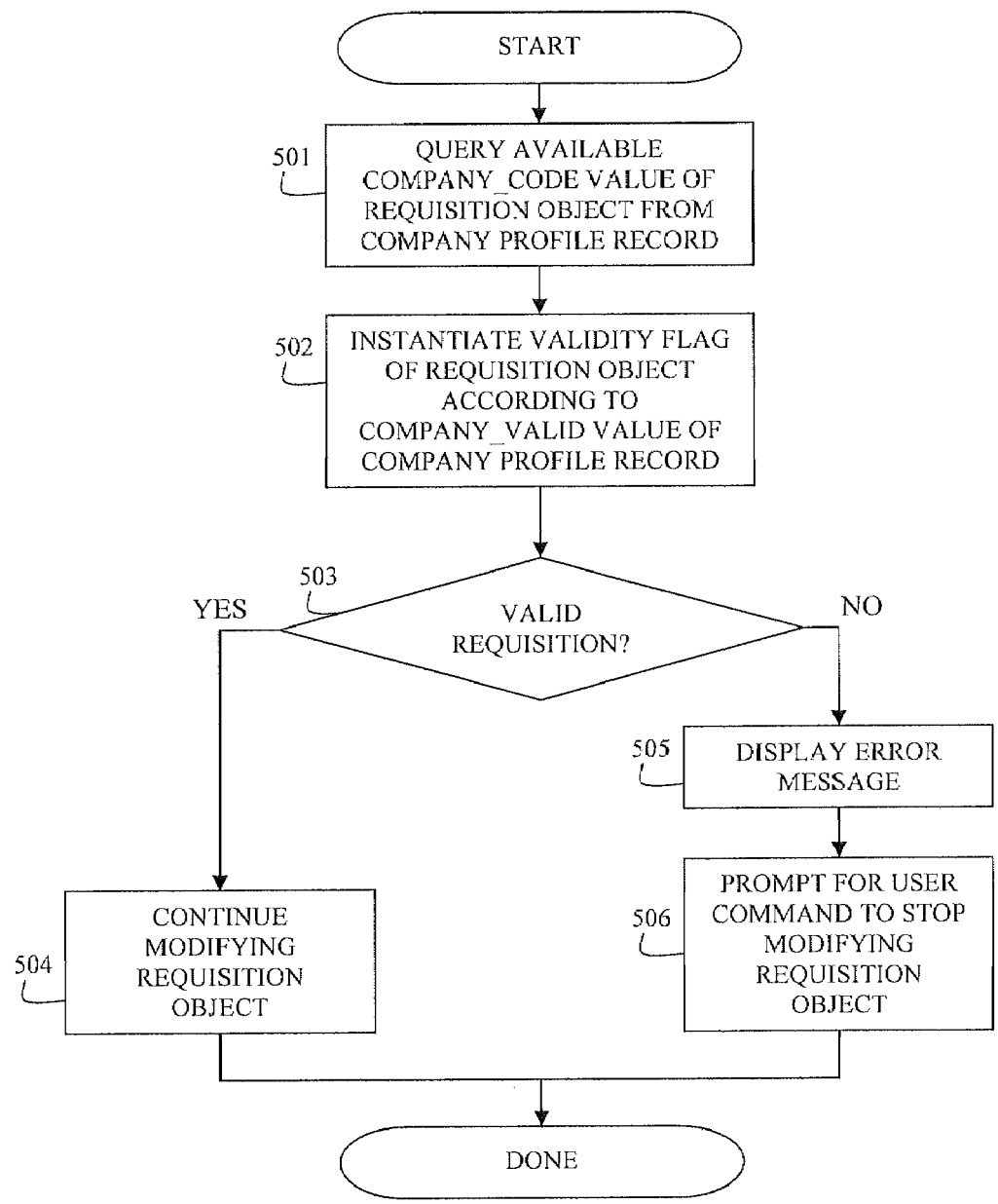
FIG. 5 is a flowchart depicting a method for the requisition object verification module of the company verification system in FIG. 2, in accordance with the embodiments of the present invention.

FIG. 5 is a flowchart depicting a method for the requisition object verification module 500 of the company verification system 100 in FIG. 2, in accordance with the embodiments of the present invention.

A requisition object is created by a user to represent a requisition that the user intends to perform. The requisition object inherits instances for common attributes from the user profile record that represents the user who creates the requisition object. Because only a user with valid company_code can create a requisition object, a value for the company_code attribute of the requisition object is initially valid.

The requisition object needs to be verified when the user attempts to modify the requisition object within the procurement application because, during the modification, the user may use an invalid value for a second company_code attribute representing a partner company in the transaction.

The validity flag of the requisition object marks the requisition object as valid or not. Thus, after the requisition object verification module is performed, it is guaranteed that the requisition object is valid within the procurement application.

In step 501, the requisition object verification module queries the company profile database record to identify all valid values for the company_code available for the requisition object.

In step 502, the requisition object verification module instantiates the validity flag of the requisition object with the company_valid attribute of the company profile record stored in the application database.

In step 503, the requisition object verification module determines whether the requisition object has a valid value for the company_code attribute as being indicated by a predefined valid value for the validity flag. If the requisition object verification module determines that the requisition object has a predefined valid value for the validity flag, the requisition object verification module proceeds to step 504. If the requisition object verification module determines that the requisition object has a predefined invalid value for the validity flag, the requisition object verification module proceeds to step 505.

In step 504, the requisition object verification module continues modifying the requisition object through a user interface because the requisition object verified as having a valid value for the company_code attribute.

In step 505, the requisition object verification module displays an error message to the user notifying that the requisition object has an invalid value for the company_code attribute and the requisition object cannot be modified.

In step 506, the requisition object verification module prompts for user command to stop modifying the requisition object.

FIG. 6 illustrates an example of the user profile cleanup program 700 of the company verification system 100 in FIG. 2, in accordance with the embodiments of the present invention.

The user profile cleanup program deletes user profile records that have an invalid value for the company_code attribute to ensure that a user without valid value for the company_code attribute in the user profile record is prohibited from logging in to the procurement application and from creating and/or modifying a requisition object. The user profile cleanup program is executed by a database administrator or by a scheduler of an operating system on which the user profile cleanup program is performed.

The user profile cleanup program checks the company profile record stored in the application database and identifies all invalid values for the company_code attribute. If the user profile cleanup program is able to identify any invalid value for the company_code attribute, the user profile cleanup program removes user profile records that have identified invalid values for the company_code attribute from the application database. If the user profile cleanup program cannot identify any invalid value for the company_code attribute, the user profile cleanup program terminates because all user profile records have valid values for the company_code attribute and proper for usage in the procurement application.

In this embodiment, the user profile cleanup program is a UNIX® shell script called "delete_invalid_profiles.sh" 710 that is executed by a command 750 invoking the UNIX® shell script "delete_invalid_profiles.sh" 710 provided on a system prompt with four arguments, wherein a first argument is "proc," a second argument is "temployee_profile," a third argument is "chrg_co_cd," and a fourth argument is "'ABC', 'DEF', 'GHI'."

In line 711, the user profile cleanup program sets a value of the first argument, "proc," provided in the command line command to "db_name" that indicates a name of the application database.

In line 712, the user profile cleanup program sets the second argument, "temployee_profile," provided in the command line command to "db_table" that indicates a name of the record in the "db_name" application database.

In line 713, the user profile cleanup program sets the third argument, "chrg_co_cd," provided in the command line command to "column_name" that indicates an attribute of the "db_table" record in the "db_name" application database.

In line 714, the user profile cleanup program sets the fourth argument, "'ABC', 'DEF', 'GHI'," provided in the command line command to "values" that indicates at least one value for the "column_name" attribute of the "db_table" record in the "db_name" application database.

In line 715, the user profile cleanup program deletes "db_table" records from "db_name" application database if a "db_table" record has a value from a group consisting of "values" for the "column_name" attribute of the "db_table" record. In this embodiment, the user profile cleanup program deletes any temployee_profile record from proc application database if chrg_co_cd column of temployee_profile record has a value 'ABC', 'DEF', or 'GHI.'

Figure 7:
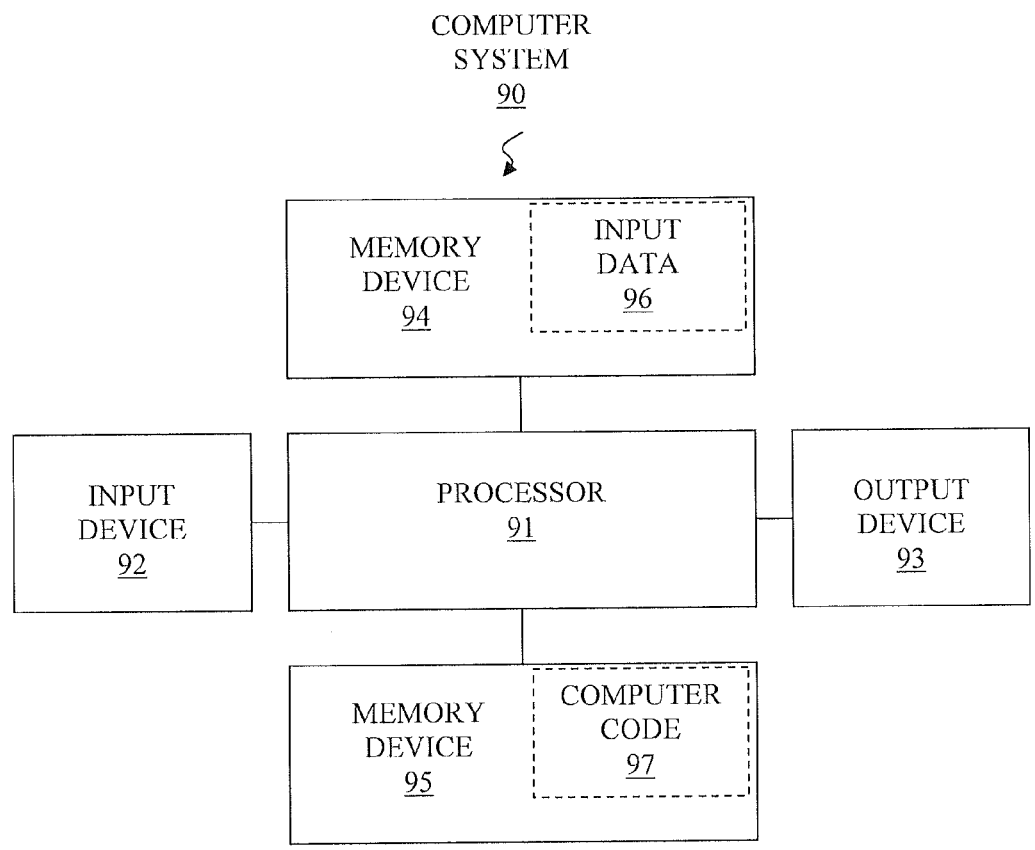
FIG. 7 illustrates a computer system used for verifying a company_code attribute for a procurement application, in accordance with embodiments of the present invention.

FIG. 7 illustrates a computer system 90 used for verifying a company_code attribute for a procurement application, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a sensor, a network interface card (NIC), a Voice/video over Internet Protocol (VoIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a NIC, a VoIP adapter, a wireless adapter, a telephone adapter, a dedicated circuit adapter, an audio and/or visual signal generator, a light emitting diode (LED), etc. The memory devices 94 and 95 may be, inter alia, a cache, a dynamic random access memory (DRAM), a readonly memory (ROM), a hard disk, a floppy disk, a magnetic tape, an optical storage such as a compact disc (CD) or a digital video disc (DVD), etc. The memory device 95 includes a computer code 97 which is a computer program that comprises computer-executable instructions. The computer code 97 includes, inter alia, an algorithm used for verifying a company_code attribute for a procurement application according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 7) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Any of the components of the present invention can be deployed, managed, serviced, etc. by a service provider that offers to deploy or integrate computing infrastructure with respect to a process for verifying a company_code attribute for a procurement application of the present invention. Thus, the present invention discloses a process for supporting computer infrastructure, comprising integrating, hosting, maintaining and deploying computer-readable code into a computing system (e.g., computing system 90), wherein the code in combination with the computing system is capable of performing a method for verifying a company_code attribute for a procurement application In another embodiment, the invention provides a business method that performs the process steps of the invention on a subscription, advertising and/or fee basis. That is, a service provider, such as a Solution Integrator, can offer to create, maintain, support, etc. a process for verifying a company_code attribute for a procurement application of the present invention. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for verifying a target attribute of a company profile record for a procurement application, wherein the procurement application, by use of a database coupled to the procurement application, supports a requisition transaction between a first user and a second user representing a first company and a second company, respectively, the method comprising:

ascertaining that the database stores the company profile record comprising the target attribute and a validity attribute associated with the target attribute of the company profile record, the validity attribute has either a VALID value indicating that the target attribute in the company profile record has a valid value or a INVALID value indicating that the target attribute in the company profile record has an invalid value within the database, and wherein a value of the target attribute of the company profile record and a value of the validity attribute of the company profile record are respectively configured by respective inputs from an administrator of the procurement application;

insuring that the database stores a first user profile record and a second user profile record, that the first user of the requisition transaction corresponds to the first user profile record, that the first user profile record comprises the target attribute having a value identical to the a value of the target attribute of a first company profile record associated with the first company represented by the first user, and that the validity attribute of the first company profile record has the VALID value such that the first user initiates the requisition transaction only when the target attribute of the first company profile record is valid; and verifying a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the requisition object record had been created by the first user within the database by instantiating a value of the target attribute of the requisition object record with a corresponding value of the first user profile record from said insuring, such that the first user is enabled to modify the requisition transaction to involve the second user only when the second user profile record has a valid target attribute.

2. The method of claim 1, said ascertaining comprising:

displaying values of the company profile record via an output device of a computer system to the administrator;

receiving a target value of the target attribute of the company profile record from the administrator, wherein the target value of the target attribute identifies a company initiating the requisition transaction, wherein the target attribute is named as "company_code";

re-displaying the values of the company profile record, wherein the values comprising the received target value;

receiving a validity value of the validity attribute associated with the received target value within the company profile record from the administrator; and saving to the database the company profile record comprising the target attribute set to the received target value and the validity attribute set to the received validity value.

3. The method of claim 1, said insuring comprising:

checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;

determining that the first value from said checking for the target attribute of the first user profile record is invalid;

displaying, responsive to said determining, the first user profile records to the first user to enable the first user to choose a second value for the target attribute of the company profile record, wherein the second value is selected from said at least one valid target instance;

receiving the second value for the target attribute of the first user profile record from said displaying; and storing the first user profile record to the database with the received second value for the target attribute.

4. The method of claim 1, said verifying comprising:

querying a first value for the target attribute of the requisition object record against a list of valid target instances for the target attribute of the first company profile record as stored in the company profile record;

setting the validity flag of the requisition object record with a value for the validity attribute of the first company profile record that is identical to the validity attribute of the first user profile record, wherein the value is VALID;

determining that the requisition object record is valid responsive to said setting; and enabling, responsive to said determining that the requisition object record is valid, the first user to modify the requisition object record in the database such that the first user updates the database with valid target attribute respectively in the first company profile record, the first user profile record, and the requisition object record.

5. The method of claim 1, said verifying comprising:

querying the company profile record in the database a first value for the target attribute of the requisition object record against valid target instances for the target attribute of the first company profile record;

setting the validity flag of the requisition object record with a value for the validity attribute of the first company profile record that is identical to the validity attribute of the first user profile record, wherein the value is INVALID;

determining that the requisition object record is invalid responsive to said setting;

displaying, responsive to said determining that the requisition object record is invalid, an error message that notifies the first user that the requisition object record is invalid for the first user to terminate modifying the requisition object record.

6. A computer program product, comprising a computer usable storage device having a computer readable program code embodied therein, said computer readable program code containing instructions that when executed by a processor of a computer system implement a method for verifying a target attribute of a company profile record for a procurement application, wherein the procurement application, by use of a database coupled to the procurement application, supports a requisition transaction between a first user and a second user representing a first company and a second company, respectively, the method comprising:

ascertaining that the database stores the company profile record comprising the target attribute and a validity attribute associated with the target attribute of the company profile record, the validity attribute has either a VALID value indicating that the target attribute in the company profile record has a valid value or a INVALID value indicating that the target attribute in the company profile record has an invalid value within the database, and wherein a value of the target attribute of the company profile record and a value of the validity attribute of the company profile record are respectively configured by respective inputs from an administrator of the procurement application;

insuring that the database stores a first user profile record and a second user profile record, that the first user of the requisition transaction corresponds to the first user profile record, that the first user profile record comprises the target attribute having a value identical to the a value of the target attribute of a first company profile record associated with the first company represented by the first user, and that the validity attribute of the first company profile record has the VALID value such that the first user initiates the requisition transaction only when the target attribute of the first company profile record is valid; and verifying a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the requisition object record had been created by the first user within the database by instantiating a value of the target attribute of the requisition object record with a corresponding value of the first user profile record from said insuring, such that the first user is enabled to modify the requisition transaction to involve the second user only when the second user profile record has a valid target attribute.

7. The computer program product of claim 6, said ascertaining comprising:

displaying values of the company profile record via an output device of a computer system to the administrator;

receiving a target value of the target attribute of the company profile record from the administrator, wherein the target value of the target attribute identifies a company initiating the requisition transaction, wherein the target attribute is named as "company_code";

re-displaying the values of the company profile record, wherein the values comprising the received target value;

receiving a validity value of the validity attribute associated with the received target value within the company profile record from the administrator; and saving to the database the company profile record comprising the target attribute set to the received target value and the validity attribute set to the received validity value.

8. The computer program product of claim 6, said insuring comprising:

checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;

determining that the first value from said checking for the target attribute of the first user profile record is invalid;

displaying, responsive to said determining, the first user profile records to the first user to enable the first user to choose a second value for the target attribute of the company profile record, wherein the second value is selected from said at least one valid target instance;

receiving the second value for the target attribute of the first user profile record from said displaying; and storing the first user profile record to the database with the received second value for the target attribute.

9. The computer program product of claim 6, said verifying comprising:
- querying a first value for the target attribute of the requisition object record against a list of valid target instances for the target attribute of the first company profile record as stored in the company profile record;
- setting the validity flag of the requisition object record with a value for the validity attribute of the first company profile record that is identical to the validity attribute of the first user profile record, wherein the value is VALID;
- determining that the requisition object record is valid responsive to said setting; and
- enabling, responsive to said determining that the requisition object record is valid, the first user to modify the requisition object record in the database such that the first user updates the database with valid target attribute respectively in the first company profile record, the first user profile record, and the requisition object record.

10. The computer program product of claim 6, said verifying comprising:
- querying the company profile record in the database a first value for the target attribute of the requisition object record against valid target instances for the target attribute of the first company profile record;
- setting the validity flag of the requisition object record with a value for the validity attribute of the first company profile record that is identical to the validity attribute of the first user profile record, wherein the value is INVALID;
- determining that the requisition object record is invalid responsive to said setting;
- displaying, responsive to said determining that the requisition object record is invalid, an error message that notifies the first user that the requisition object record is invalid for the first user to terminate modifying the requisition object record.

11. A computer system comprising a processor and a computer readable memory unit coupled to the processor, said memory unit containing instructions that when executed by the processor implement a method for verifying a target attribute of a company profile record for a procurement application, wherein the procurement application, by use of a database coupled to the procurement application, supports a requisition transaction between a first user and a second user representing a first company and a second company, respectively, the method comprising:
- ascertaining that the database stores the company profile record comprising the target attribute and a validity attribute associated with the target attribute of the company profile record, the validity attribute has either a VALID value indicating that the target attribute in the company profile record has a valid value or a INVALID value indicating that the target attribute in the company profile record has an invalid value within the database, and wherein a value of the target attribute of the company profile record and a value of the validity attribute of the company profile record are respectively configured by respective inputs from an administrator of the procurement application;
- insuring that the database stores a first user profile record and a second user profile record, that the first user of the requisition transaction corresponds to the first user profile record the first user profile record comprises the target attribute having a value identical to the a value of the target attribute of a first company profile record associated with the first company represented by the first user, and that the validity attribute of the first company profile record has the VALID value such that the first user initiates the requisition transaction only when the target attribute of the first company profile record is valid; and
- verifying a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the requisition object record had been created by the first user within the database by instantiating a value of the target attribute of the requisition object record with a corresponding value of the first user profile record from said insuring, such that the first user is enabled to modify the requisition transaction to involve the second user only when the second user profile record has a valid target attribute.

12. The computer system of claim 11, said ascertaining comprising:
- displaying values of the company profile record via an output device of a computer system to the administrator;
- receiving a target value of the target attribute of the company profile record from the administrator, wherein the target value of the target attribute identifies a company initiating the requisition transaction, wherein the target attribute is named as "company_code";
- re-displaying the values of the company profile record, wherein the values comprising the received target value;
- receiving a validity value of the validity attribute associated with the received target value within the company profile record from the administrator; and
- saving to the database the company profile record comprising the target attribute set to the received target value and the validity attribute set to the received validity value.

13. The computer system of claim 11, said insuring comprising:
- checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;
- determining that the first value from said checking for the target attribute of the first user profile record is invalid;
- displaying, responsive to said determining, the first user profile records to the first user to enable the first user to choose a second value for the target attribute of the company profile record, wherein the second value is selected from said at least one valid target instance;
- receiving the second value for the target attribute of the first user profile record from said displaying; and
- storing the first user profile record to the database with the received second value for the target attribute.

14. The computer system of claim 11, said verifying comprising:
- querying a first value for the target attribute of the requisition object record against a list of valid target instances for the target attribute of the first company profile record as stored in the company profile record;
- setting the validity flag of the requisition object record with a value for the validity attribute of the first company profile record that is identical to the validity attribute of the first user profile record, wherein the value is VALID;

determining that the requisition object record is valid responsive to said setting; and enabling, responsive to said determining that the requisition object record is valid, the first user to modify the requisition object record in the database such that the first user updates the database with valid target attribute respectively in the first company profile record, the first user profile record, and the requisition object record.

15. The computer system of claim 11, said verifying comprising:

querying the company profile record in the database a first value for the target attribute of the requisition object record against valid target instances for the target attribute of the first company profile record;

setting the validity flag of the requisition object record with a value for the validity attribute of the first company profile record that is identical to the validity attribute of the first user profile record, wherein the value is INVALID;

determining that the requisition object record is invalid responsive to said setting;

displaying, responsive to said determining that the requisition object record is invalid, an error message that notifies the first user that the requisition object record is invalid for the first user to terminate modifying the requisition object record.

16. A process for supporting computer infrastructure, said process comprising providing at least one support service for at least one of creating, integrating, hosting, maintaining, and deploying computer-readable code in a computing system, wherein the code in combination with the computing system is capable of performing a method for verifying a target attribute of a company profile record for a procurement application, wherein the procurement application, by use of a database coupled to the procurement application, supports a requisition transaction between a first user and a second user representing a first company and a second company, respectively, the method comprising:

ascertaining that the database stores the company profile record comprising the target attribute and a validity attribute associated with the target attribute of the company profile record, the validity attribute has either a VALID value indicating that the target attribute in the company profile record has a valid value or a INVALID value indicating that the target attribute in the company profile record has an invalid value within the database, and wherein a value of the target attribute of the company profile record and a value of the validity attribute of the company profile record are respectively configured by respective inputs from an administrator of the procurement application;

insuring that the database stores a first user profile record and a second user profile record, that the first user of the requisition transaction corresponds to the first user profile record, the first user profile record comprises the target attribute having a value identical to the a value of the target attribute of a first company profile record associated with the first company represented by the first user, and that the validity attribute of the first company profile record has the VALID value such that the first user initiates the requisition transaction only when the target attribute of the first company profile record is valid; and verifying a requisition object record corresponding to the requisition transaction, wherein the requisition object record comprises the target attribute and a validity flag, wherein the validity flag of the requisition object record indicates whether or not the requisition object record is valid and usable in the requisition transaction, wherein the requisition object record had been created by the first user within the database by instantiating a value of the target attribute of the requisition object record with a corresponding value of the first user profile record from said insuring, such that the first user is enabled to modify the requisition transaction to involve the second user only when the second user profile record has a valid target attribute.

17. The process of claim 16, said ascertaining comprising:

displaying values of the company profile record via an output device of a computer system to the administrator;

receiving a target value of the target attribute of the company profile record from the administrator, wherein the target value of the target attribute identifies a company initiating the requisition transaction, wherein the target attribute is named as "company_code";

re-displaying the values of the company profile record, wherein the values comprising the received target value;

receiving a validity value of the validity attribute associated with the received target value within the company profile record from the administrator; and saving to the database the company profile record comprising the target attribute set to the received target value and the validity attribute set to the received validity value.

18. The process of claim 16, said insuring comprising:

checking the database for a first value for the target attribute of the first user profile record against at least one valid target instance for the target attribute of the company profile record, wherein the validity attribute of the company profile record has a predefined valid value when the company profile record comprises a valid target instance from said at least one valid target instance for the target attribute;

determining that the first value from said checking for the target attribute of the first user profile record is invalid;

displaying, responsive to said determining, the first user profile records to the first user to enable the first user to choose a second value for the target attribute of the company profile record, wherein the second value is selected from said at least one valid target instance;

receiving the second value for the target attribute of the first user profile record from said displaying; and storing the first user profile record to the database with the received second value for the target attribute.

19. The process of claim 16, said verifying comprising:

querying a first value for the target attribute of the requisition object record against a list of valid target instances for the target attribute of the first company profile record as stored in the company profile record;

setting the validity flag of the requisition object record with a value for the validity attribute of the first company profile record that is identical to the validity attribute of the first user profile record, wherein the value is VALID;

determining that the requisition object record is valid responsive to said setting; and enabling, responsive to said determining that the requisition object record is valid, the first user to modify the requisition object record in the database such that the first user updates the database with valid target attribute respectively in the first company profile record, the first user profile record, and the requisition object record.

20. The process of claim 16, said verifying comprising:

querying the company profile record in the database a first value for the target attribute of the requisition object record against valid target instances for the target attribute of the first company profile record;

setting the validity flag of the requisition object record with a value for the validity attribute of the first company profile record that is identical to the validity attribute of the first user profile record, wherein the value is INVALID;

determining that the requisition object record is invalid responsive to said setting;

displaying, responsive to said determining that the requisition object record is invalid, an error message that notifies the first user that the requisition object record is invalid for the first user to terminate modifying the requisition object record.

* * * * *